Dec. 11, 1923.  
A. ERVEN  
SURFACE PLOW CULTIVATOR  
Filed Sept. 9, 1919
1,477,333
2 Sheets-Sheet 1
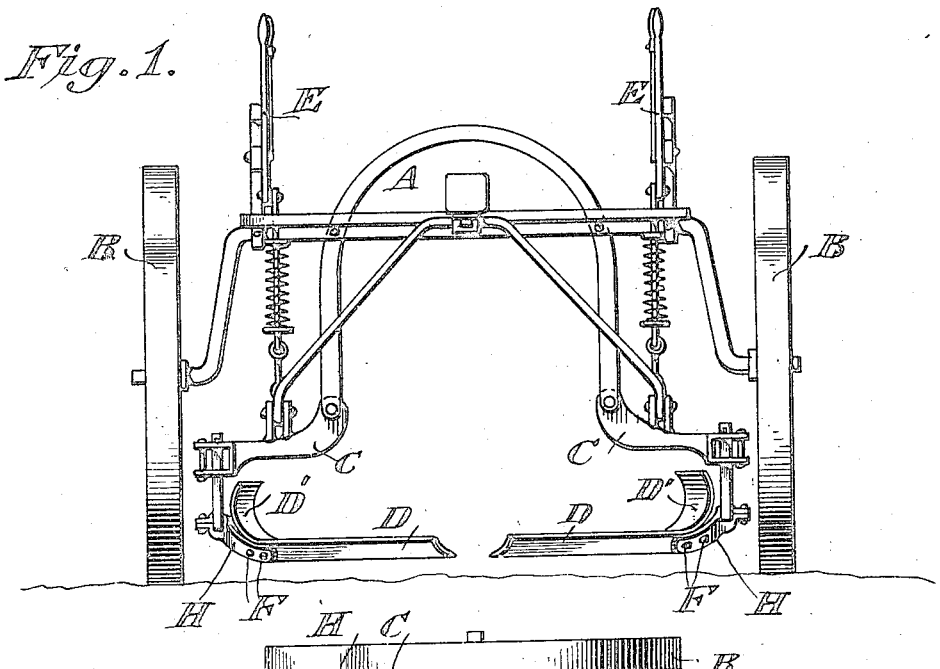
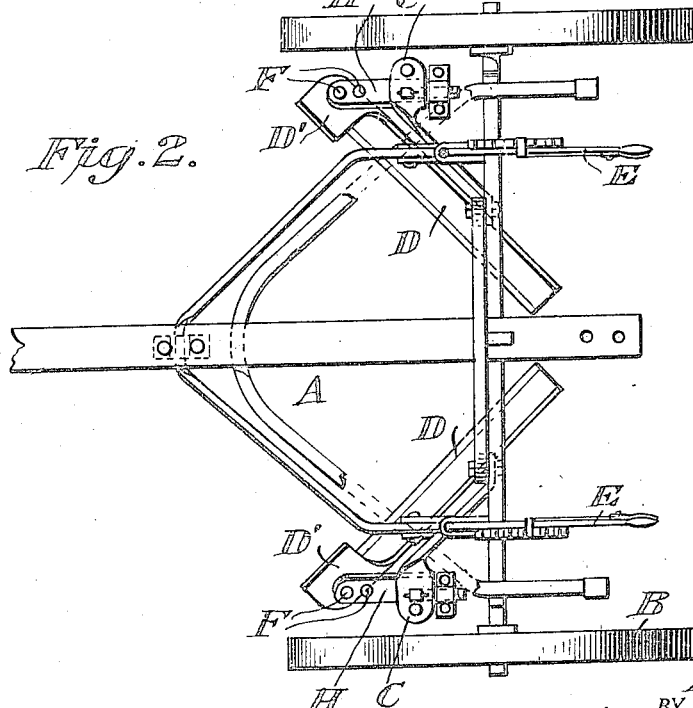
INVENTOR.
Andrew Erven
BY
Franklin N. Hoyt
ATTORNEYS.

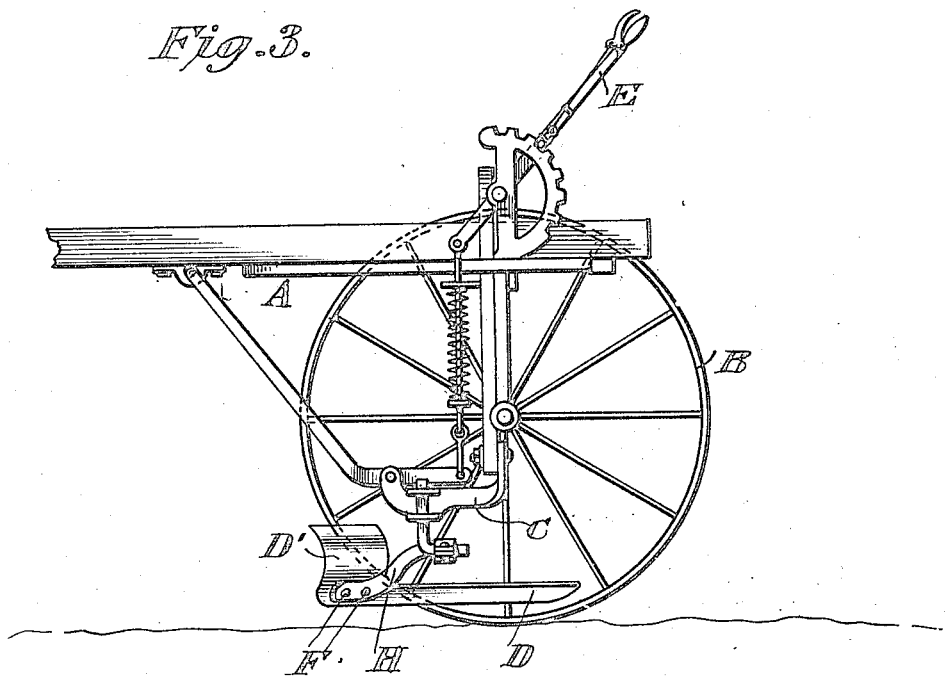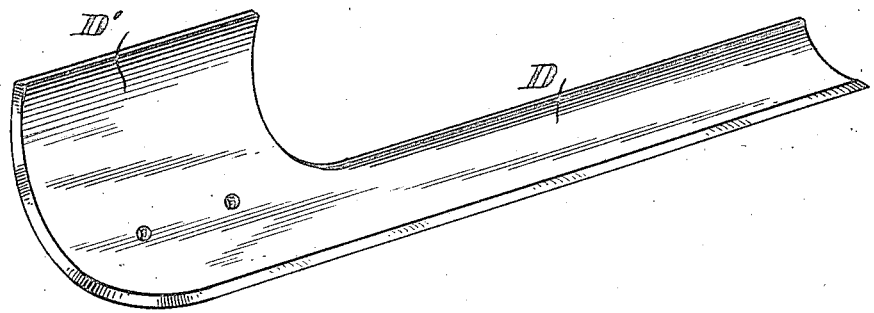

Patented Dec. 11, 1923.

1,477,333

UNITED STATES PATENT OFFICE.

ANDREW ERVEN, OF WESTVILLE, ILLINOIS.

SURFACE PLOW CULTIVATOR.

Application filed September 9, 1919. Serial No. 322,744.

*To all whom it may concern:*

Be it known that I, ANDREW ERVEN, a citizen of the United States, residing at Westville, in the county of Vermilion and State of Illinois, have invented certain new and useful Improvements in Surface Plow Cultivators; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in cultivators and especially to attachments, comprising two scraping blades arranged substantially at right angles to each other and each formed of a concaved sheet of metal, the forward ends of which are bent laterally and adapted to scoop up the soil as the machine passes over the ground.

The invention comprises various details of construction, combination and arrangement of parts which will be hereinafter fully described, shown in the accompanying drawings and then specifically defined in the appended claim.

My invention is illustrated in the accompanying drawings which, with the letters of reference marked thereon, form a part of this application, and in which;

Figure 1 is a rear view of a cultivator embodying the features of my invention.

Figure 2 is a top plan view.

Figure 3 is a side view, and

Figure 4 is an enlarged detail perspective view of one of the surface plows.

Reference now being had to the details of the drawings by letter:

A designates the frame of a cultivator, mounted upon wheels B, B. C, C are brackets for supporting the scraping blades D, D. E, E are levers mounted upon the frame of the apparatus and affording means for raising and lowering the blades. Each blade (made preferably of sheet steel) has a shank portion which is transversely curved on the arc of a circle and the forward end of each blade has an integral lateral extension D' which is similarly transversely curved on the arc of a circle.

The two blades are fastened by means of bolts F, F passed through the blades and the supporting arms H therefor, said blades being held substantially at right angles to each other, as shown in the drawings.

By the provision of the lever actuated mechanism, the scraping blades may be raised and lowered and held at different inclinations to cut at different depths.

In operation, the apparatus is moved forward over the surface of the ground, with the blades so arranged as to engage and scoop up the soil. The adjacent edges of the blades and also the lateral extensions have sharpened edges in order to facilitate the cutting of the soil and weeds. The curvature of the blades and the extensions thereof functions to roll and pulverize the dirt into dust.

What I claim to be new is:

A cultivator comprising spaced blocks having inwardly upwardly and rearwardly directed arms, an upwardly bowed bar having its lower spaced extremities pivotally secured to the blocks, said blocks being provided with approximately horizontally positioned recesses, earth-working tools having rigid braces, brackets connected with said braces and transecting said recesses, means to secure said brackets rigidly connected with said blocks and a wheel supported frame carrying said structure.

In testimony whereof I hereunto affix my signature.

ANDREW ERVEN.